(12) United States Patent  (10) Patent No.: US 6,999,630 B1
Drouot  (45) Date of Patent: Feb. 14, 2006

(54) METHOD OF PROCESSING, AND CORRESPONDING FILTERING DEVICE

(75) Inventor: Antoine Drouot, Saint Maur des Fosses (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 695 days.

(21) Appl. No.: 09/672,182

(22) Filed: Sep. 28, 2000

(30) Foreign Application Priority Data

Sep. 28, 1999 (EP) ................... 99402366

(51) Int. Cl.
*G06K 9/40* (2006.01)
*G06K 9/48* (2006.01)
*G06K 9/56* (2006.01)
*H04N 1/38* (2006.01)
*H04N 5/21* (2006.01)

(52) U.S. Cl. ................ 382/262; 382/199; 382/205; 382/261; 382/268; 348/606; 348/607; 348/625; 358/463

(58) Field of Classification Search ................ 382/173, 382/195, 199, 205, 260, 261, 262, 265, 266, 382/268; 348/606, 607, 625, 628, 629; 358/462–465
See application file for complete search history.

(56) References Cited

U.S. PATENT DOCUMENTS 4,642,813 A * 2/1987 Wilder ................ 382/147
5,379,074 A * 1/1995 Hwang ................ 348/606
5,473,384 A * 12/1995 Jayant et al. ........... 348/470
5,850,294 A * 12/1998 Apostolopoulos et al. .................. 358/426.14

(Continued)

FOREIGN PATENT DOCUMENTS

| EP | 0401077 A2 | 12/1990 |
|---|---|---|
| EP | 0878776 A1 | 11/1998 |
| GB | 2321816 A | 8/1998 |
| GB | 2322252 A | 8/1998 |
| GB | 2323235 A | 9/1998 |

OTHER PUBLICATIONS

Lee et al., "Blocking Effect Reduction of JPEG Images by Signal Adaptive Filtering." Feb. 1998, IEEE Transactions on Image Processing, vol. 7, No. 2, pp 229-234.*

(Continued)

*Primary Examiner*—Jingge Wu
*Assistant Examiner*—Anthony Mackowey

(57) ABSTRACT

The invention relates to a method of processing data, which may be pixels (P[i,j]) representing a sequence of pictures, previously encoded and decoded. The method comprises at least in series a first step (ED) of detecting edge pixels within a picture, followed by a subsequent step (TEST) in which a choice is made from the pixels not detected as edges in the previous step, as to whether these pixels are to be filtered or not. Then, the method comprises a filtering step (SAF) which consists in replacing at least a pixel to be filtered with a pixel belonging to a close neighborhood of said pixel, said close neighborhood comprising said pixel and pixels adjacent to said pixel.

8 Claims, 4 Drawing Sheets

Figures 1, 2:
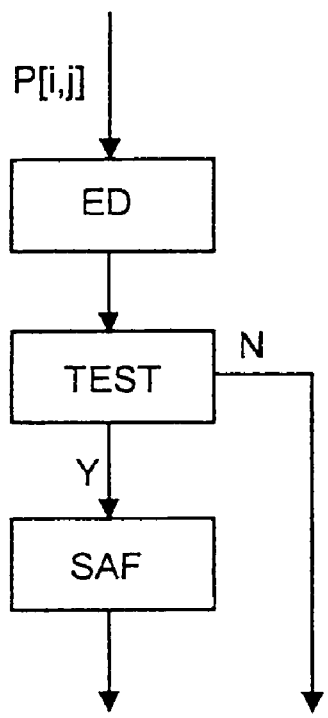

$$SH = \begin{pmatrix} -1 & -2 & -1 \\ 0 & 0 & 0 \\ 1 & 2 & 1 \end{pmatrix} \quad SV = \begin{pmatrix} -1 & 0 & 1 \\ -2 & 0 & 2 \\ -1 & 0 & 1 \end{pmatrix}$$

$$Y = \begin{pmatrix} P[i-1,j-1] & P[i-1,j] & P[i-1,j+1] \\ P[i,j-1] & P[i,j] & P[i,j+1] \\ P[i+1,j-1] & P[i+1,j] & P[i+1,j+1] \end{pmatrix}$$

U.S. PATENT DOCUMENTS

| | | | | |
|---|---|---|---|---|
| 5,852,475 | A | * | 12/1998 | Gupta et al. ................. 348/606 |
| 5,999,639 | A | * | 12/1999 | Rogers et al. .............. 382/132 |
| 6,192,153 | B1 | * | 2/2001 | Suzuki et al. ................ 382/199 |
| 6,229,578 | B1 | * | 5/2001 | Acharya et al. ............ 348/607 |
| 6,343,158 | B1 | * | 1/2002 | Shiohara ..................... 382/261 |
| 6,438,270 | B1 | * | 8/2002 | Harrington .................. 382/262 |
| 6,539,125 | B1 | * | 3/2003 | Harrington .................. 382/262 |
| 6,603,877 | B1 | * | 8/2003 | Bishop ........................ 382/165 |
| 6,901,170 | B1 | * | 5/2005 | Terada et al. ............... 382/260 |

OTHER PUBLICATIONS

Baxes, Gregory A., Digital Image Processing: principles and applications, 1994, John Wiley & Sons, p. 365.*

Hyun Wook Park et al, "A Postprocessing Method for Reducing Quantization Effects Inn Low Bit-Rate Moving Picture Coding", IEEE Transactions on CSVT, vol. 9, No. 1, Feb. 1999, pp. 161-171.

* cited by examiner $$SH = \begin{pmatrix} -1 & -2 & -1 \\ 0 & 0 & 0 \\ 1 & 2 & 1 \end{pmatrix} \quad SV = \begin{pmatrix} -1 & 0 & \boxed{1} \\ -2 & 0 & 2 \\ -1 & 0 & 1 \end{pmatrix}$$

$$Y = \begin{pmatrix} P[i-1,j-1] & P[i-1,j] & P[i-1,j+1] \\ P[i,j-1] & P[i,j] & P[i,j+1] \\ P[i+1,j-1] & P[i+1,j] & P[i+1,j+1] \end{pmatrix}$$

METHOD OF PROCESSING, AND CORRESPONDING FILTERING DEVICE

FIELD OF THE INVENTION

The invention relates to a method of processing data which represent a sequence of pictures, previously encoded and decoded.

The invention also relates to a filtering device for carrying out such a method. The invention is particularly relevant for the post-processing of a low-bitrate video signal which was previously compressed and decompressed.

BACKGROUND ART

Coding a sequence of pictures comprises different steps. Each picture is composed of a bidimensional array of picture elements or pixels, each of them having luminance and chrominance components. For encoding purposes, the picture is subdivided into non-overlapping blocks of pixels. A discrete cosine transform (DCT) is applied to each block of the picture. The coefficients obtained from this DCT are rounded to the closest value given by a fixed quantization law and then quantized, depending on the spatial frequency within the block that they represent. The quantized data thus obtained are then coded. During a decoding step, the coded data are successively decoded, treated by inverse quantization and inverse discrete cosine transform, and finally filtered before being displayed.

Quantization is, in data transmission, one of the steps for data compression and is a treatment which involves losses. The quantization errors introduced by quantization of the DCT coefficients in the coding have as a main result the occurrence of ringing artifacts. This ringing noise is the Gibb's phenomenon caused by truncation of the high-frequency coefficients through quantization during encoding. Therefore, ringing artifacts occur near high-frequency areas which are located in low activity regions and may appear as "false edges" in the picture.

A possible method of removing these ringing artifacts is proposed by Park et al. in IEEE Transactions on CSVT, vol. 9, no. 1, February 1999, pp 161–171. The disclosed method comprises, for a given picture, a first step of edge detection followed by a low-pass filtering. The edge detection step makes use of a quantized factor QP taken from the encoding stage. Furthermore, the proposed filtering step involves low-pass filtering of the luminance components by means of the derivation of weighted means of a defined set of luminance values. Thus the method proposed by the prior art involves the use of encoding parameters, which might not always be available at the edge detection stage, while the low-pass filtering may introduce blurring effects in areas of the picture where extreme values of luminance can be found.

SUMMARY OF THE INVENTION

It is an object of the invention to propose an efficient method of processing picture data resulting in a picture of better quality and highly removed from artifacts due to a prior compression of the picture.

To this end, a method as described in the introduction comprises at least in series the steps of:
  detecting edge pixels within a picture,
  determining pixels to be filtered from among pixels which were not detected as edges in the previous step,
  replacing at least a pixel to be filtered with a pixel belonging to a close neighborhood of said pixel, said close neighborhood comprising said pixel and pixels adjacent to said pixel.

In a method according to the invention, there is a first step of edge detection in order to predict the areas in the picture where ringing is likely to occur. Indeed, ringing effects mainly appear in areas located along edges in a picture. These areas along edges may be filtered without disturbing the picture edges. The pixels belonging to these areas may be corrected by being replaced by an adjacent pixel. An advantage of the proposed correction of pixels to be filtered is the high picture quality because the filter does not introduce annoying blurring effects as does the low-pass filter of the prior art. Another advantage of the invention is that the proposed method does not require any information from a previous treatment applied to the picture data, contrary to the method disclosed by the prior art. Furthermore, a pixel not detected as an edge pixel in the first step of a method according to the invention is not necessarily filtered. A second step is performed in order to determine which pixels may be filtered according to set of criteria.

In an embodiment of the invention, at least the pixel to be filtered is replaced with the median pixel of a set having an odd number of pixels which were not detected as edges, the set comprising at least once said pixel and pixels adjacent to said pixel.

In this embodiment of the invention, a set is formed for a pixel to be filtered, with an odd number of pixels belonging to a close neighborhood of said pixel. The median filter allows to replace a pixel value which was not detected as an edge with the median pixel value of this set associated with the pixel. Thus, thanks to this median filtering step, any extreme value in the neighborhood of the pixel is removed. In the document of the prior art, extreme pixels in the neighborhood of a pixel are taken into account in the filtering and may have a blurring influence on the filtered pixel.

In another embodiment of the invention, the method is applied to the luminance component of the pixels of a picture. The human eye is very sensitive to the luminance component and therefore filtering of the luminance components gives a very high processed picture quality.

The invention also relates to a filtering device for carrying out a method according to the invention.

Figure 3:
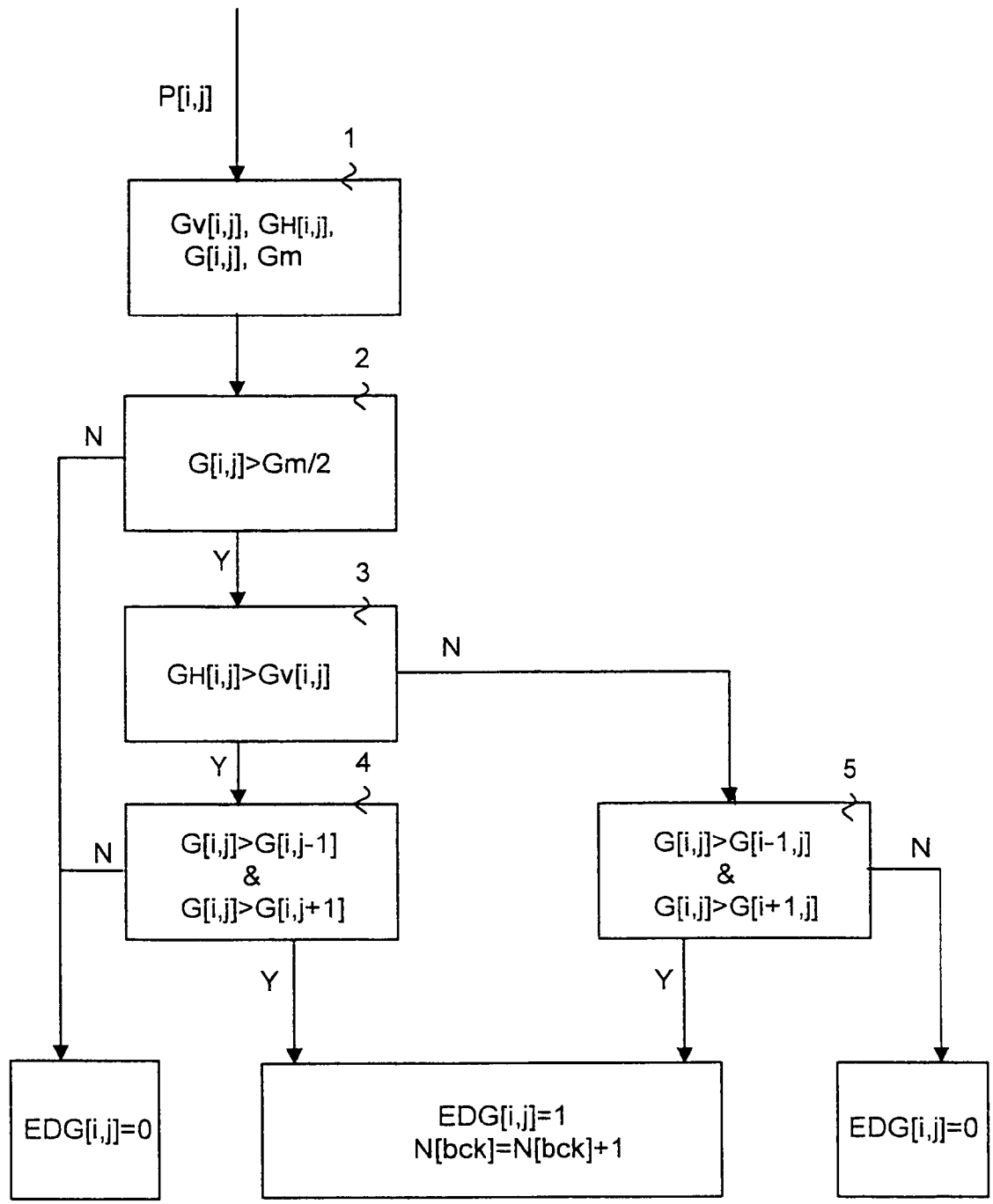
Figures 4, 5:
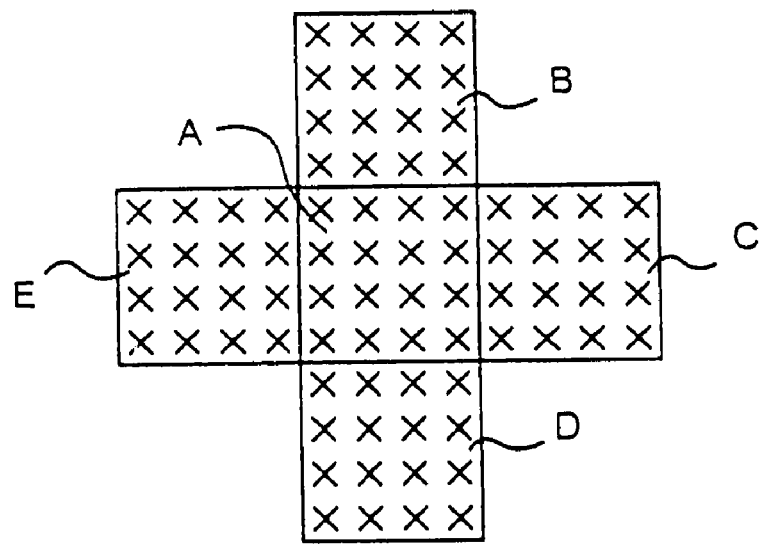
Figure 6:
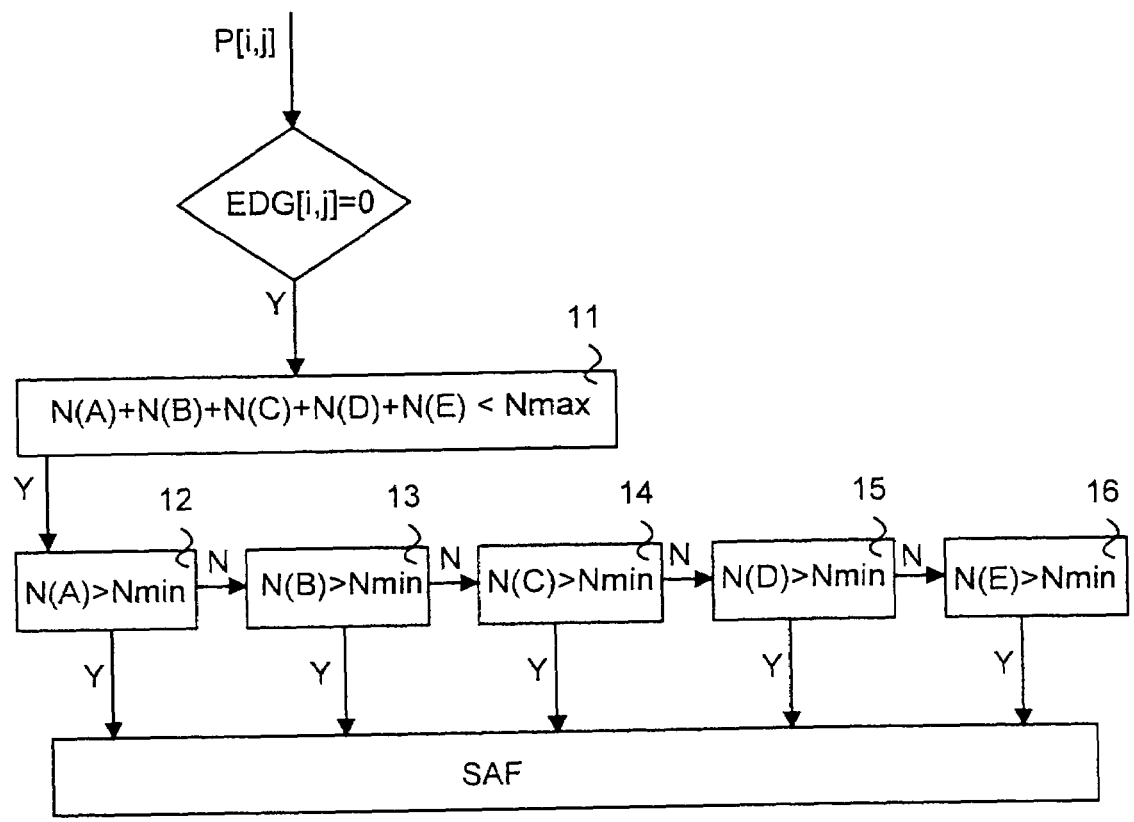

The particular aspects of the invention will now be explained with reference to the embodiments described hereinafter and considered in connection with the accompanying drawings, in which:

FIG. 1 is a block diagram of the various steps of a method according to the invention, FIG. 2 is a diagram of a pixel neighborhood, FIG. 3 is a block diagram of an edge detection step according to the invention, FIG. 4 gives the matrices used for the edge detection, FIG. 5 shows five neighboring blocks of pixels, FIG. 6 is a block diagram of a step allowing to decide whether a pixel should be filtered according to the invention.

A method of processing data according to the invention is depicted in FIG. 1. In this embodiment, the method is applied to successive pixels P[i,j]. In this embodiment of the invention, the provided pixels P[i,j] belong to a frame in the spatial domain which was possibly compressed and decompressed in a previous treatment. An edge detection is performed during a step ED for each received pixel P[i,j] and allows to determine whether the received pixel P[i,j] is an edge or not. This step of edge detection will be explained in detail in a paragraph below. A pixel P[i,j] detected as an edge during the edge detection step is given an associated value EDG[i,j] of 1. A pixel P[i,j] not detected as an edge during the edge detection step is given an associated value EDG[i,j] of 0. If the pixel P[i,j] is not detected as an edge, which means EDG[i,j]=0, the pixel P[i,j] may be filtered in a spatially-adaptive filter SAF. In fact, a pixel P[i,j] not detected as an edge is filtered when additional conditions are satisfied. These additional conditions will be defined in a paragraph below. The decision of filtering a pixel P[i,j] not detected as an edge is taken in a step TEST described below with reference to FIG. 6. If the pixel P[i,j] is detected as an edge, it is not filtered and not modified. Indeed, only pixels along edges, but which are not edges, may be filtered so that picture contours are preserved.

FIG. 2 shows a pixel P[i,j] belonging to a picture to be processed. This pixel P[i,j] is surrounded by eight adjacent pixels {P[i−1,j−1], P[i−1,j], P[i−1,j+1], P[i,j+1], P[i+1,j+1], P[i+1,j], P[i+1,j−1], P[i,j−1]} located in a close neighborhood of the pixel P[i,j]. The pixels P[i,j−1], P[i−1,j], P[i,j+1], P[i+1,j] will be referred to as the left pixel, the upper pixel, the right pixel and the lower pixel of P[i,j], respectively, hereinafter.

A possible way of performing an edge detection step ED according to the invention is depicted in FIG. 3. In this embodiment of the invention, each picture may be divided into non-overlapping blocks of 4×4 pixels, each block having a number N[bck] of detected edges. This proposed step of edge detection ED, in accordance with the invention, is based on the luminance component Y[i,j] of each pixel P[i,j]. This is by no means a limitation of the invention and any pixel component may be used as the so-called pixel value in the calculations involved in such a step of edge detection. For each provided pixel P[i,j], a horizontal component GH[i,j] and a vertical component Gv[i,j] of a gradient G[i,j] are evaluated. A possible way of deriving a gradient is to use the Sobel matrices SH and Sv given in FIG. 4. Let us consider a matrix composed of the luminance component Y[i,j] of the pixel P[i,j] and the luminance components {Y[i−1,j−1], ..., Y[i,j−1]} of the eight adjacent pixels {P[i−1,j−1], ..., P[i,j−1]} as shown in FIG. 4. The horizontal and vertical components GH[i,j], Gv[i,j] respectively, of the gradient G[i,j] are then derived as convolution products as follows:

$$G_H[i,j]=Y*S_H$$

$$G_V[i,j]=Y*S_V$$

The gradient G[i,j] is the modulus of the two components and is worth $\sqrt{G_H^2[i,j]+G_V^2[i,j]}$. A pixel, having a greater gradient than its surrounding pixels, is more likely to be detected as an edge.

Thus, as shown in FIG. 3 in a first step 1, the gradient G[i,j] is derived for each pixel P[i,j] of a picture and a mean Gm of the various obtained gradients is also derived for the whole picture. Then, in a subsequent step 2 and for each provided pixel P[i,j], the gradient G[i,j] of the pixel P[i,j] is compared with the mean Gm. If the gradient G[i,j] is lower than half the mean Gm, the corresponding pixel P[i,j] is not detected as an edge and EDG[i,j] is set to 0. If the gradient G[i,j] is greater than half the mean Gm, the pixel P[i,j] may be detected as an edge, and the horizontal and vertical components GH[i,j], Gv[i,j] are compared in turn as described in the next paragraphs.

The pixel P[i,j] belongs to a horizontal edge if, in a step 3, the horizontal component GH[i,j] is greater than the vertical component Gv[i,j] and, in a step 4, the gradient G[i,j] is greater than both the gradient G[i,j−1] of the left pixel P[i,j−1] and the gradient G[i,j+1] of the right pixel P[i,j+1]. In such a case, P[i,j] is detected as an edge and EDG[i,j] is set to 1 and the number N[bck] of detected edges in the block, to which P[i,j] belongs, is incremented.

If in the step 4 the horizontal component GH[i,j] is greater than the vertical component Gv[i,j] and the gradient G[i,j] is lower than either the gradient G[i,j−1] of the left pixel P[i,j−1] or the gradient G[i,j+1] of the right pixel P[i,j+1], the pixel P[i,j] is not detected as an edge, and EDG[i,j] is set to 0.

The pixel P[i,j] belongs to a vertical edge if, in the step 3, the horizontal component GH[i,j] is lower than the vertical component Gv[i,j] and, in a step 5, the gradient G[i,j] is greater than both the gradient G[i−1,j] of the upper pixel P[i−1,j] and the gradient G[i+1,j] of the lower pixel P[i+1,j]. In such a case, the pixel P[i,j] is detected as an edge, EDG[i,j] is set to 1 and the number N[bck] of detected edges of the block to which P[i,j] belongs is incremented.

If in the step 5 the horizontal component GH[i,j] is lower than the vertical component Gv[i,j] and the gradient G[i,j] is greater than either the gradient G[i−1,j] of the upper pixel P[i−1,j] or the gradient G[i+1,j] of the lower pixel P[i+1,j], the pixel P[i,j] is not detected as an edge and EDG[i,j] is set to 0. The proposed edge detection step only provides edges having a width of one pixel at most so that a fine filtering may be performed.

In FIG. 5, a block A consisting of 4×4 pixels P[i,j] is surrounded by four non-overlapping 4×4 blocks B, C, D, E. Let us consider a pixel P[i,j] belonging to the block A, which was not detected as an edge during the edge detection step depicted in FIG. 3 and which may be filtered. Thus a pixel P[i,j] may be filtered when EDG[i,j]=0. In an embodiment of the invention, any pixel P[i,j] not detected as an edge is not necessarily filtered. Indeed, additional conditions have to be satisfied, as shown in FIG. 6, where operations performed in the TEST unit of FIG. 1 are depicted. Thus, for any pixel P[i,j] belonging to the block A and having a value EDG[i,j] of 0, the density of detected edges in a defined neighborhood of the pixel P[i,j] is taken into account. Thus, for example, a condition is set up for the total amount of edges in the block A and in the neighboring blocks B, C, D, and E. In a step 11, a first condition is tested: the total number of edges in the blocks A, B, C, D, and E must be lower than a predetermined maximum number of edges Nmax. Thus the sum of the numbers of edges N(A), N(B), N(C), N(D), N(E) per block A, B, C, D, E, respectively, must be lower than the defined number Nmax. In the present case, the total number of edges is greater than Nmax: there are too many edges in total in the five blocks A, B, C, D, E, and the pixel P[i,j] is not filtered. If the number of edges in the five blocks A, B, C, D, E is not greater than Nmax, some additional conditions are set concerning the minimum number of edges per block in order to decide whether the pixel P[i,j] shall be filtered. In subsequent steps 12, 13, 14, 15 and 16 the number of edges per block is compared with a minimum threshold Nmin. At least one of the blocks A, B, C, D, and E must contain at least a minimum number of edges Nmin. If and when all these conditions are satisfied, the choice is made of transmitting the pixel P[i,j] to the spatially-adaptive filter SAF for filtering. If not, i.e. the total number of edges in the five blocks A, B, C, D, E is greater than Nmax or none of the blocks contain at least Nmin edges, the pixel P[i,j] is not filtered. The order in which the steps 11, 12, 13, 14, 15, 16 are carried out in this embodiment is immaterial; any other order may be chosen. The predetermined numbers Nmin and Nmax allow to adjust the precision of the method. Nmax is used to prevent the filtering of areas which are too complex and which could lead to degradations when filtered. Nmin will be chosen low enough so that the effect of the method is not reduced.

An example of a spatially-adaptive filtering step SAF is given in detail in the following paragraphs. It should be noted that the term SAF may indicate a filtering step as well as a filter. Thus, a possible spatially-adaptive filter SAF replaces the luminance value Y[i,j] of the pixel P[i,j] with the median value of a corresponding set S[i,j]. The set S[i,j] associated with the pixel P[i,j] may possibly comprise the luminance components Y[i,j], Y[i−1,j], Y[i+1,j], Y[i,j−1] and Y[i,j+1] of the adjacent pixels P[i,j], P[i−1,j], P[i+1,j], P[i,j−1] and P[i,j+1]. Each luminance component Y[i−1,j], Y[i+1,j], Y[i,j−1] or Y[i,j+1] effectively belongs to the set S[i,j] when the associated pixel P[i,j] is not detected as an edge. The set S[i,j] also comprises the value Y[i,j], which may be repeated so that the set S[i,j] is composed of an odd number of values. An even number of elements of the set S[i,j] would render it necessary to derive the mean of the two median values of the set S[i,j], which would lead to a low-pass filtering. Table 1 gives the composition of the possible sets S[i,j] for a given pixel P[i,j] to be filtered in dependence on the status of the adjacent pixels P[i−1,j], P[i+1,j], P[i,j−1], P[i,j+1], i.e. whether these are edge pixels or not.

TABLE 1

| EDG [i − 1, j] | EDG [i, j − 1] | EDG [i + 1, j] | EDG [i, j + 1] | S [i, j] |
|---|---|---|---|---|
| 0 | 0 | 0 | 0 | {Y[i, j], Y[i − 1, j], Y[i, j − 1], Y[i + 1, j], Y[i, j + 1]} |
| 0 | 0 | 0 | 1 | {Y[i, j], Y[i, j], Y[i − 1, j], Y[i, j − 1], Y[i + 1, j]} |
| 0 | 0 | 1 | 0 | {Y[i, j], Y[i, j], Y[i − 1, j], Y[i, j − 1], Y[i, j + 1]} |
| 0 | 0 | 1 | 1 | {Y[i, j], Y[i − 1, j], Y[i, j − 1]} |
| 0 | 1 | 0 | 0 | {Y[i, j], Y[i, j], Y[i − 1, j], Y[i + 1, j], Y[i, j + 1]} |
| 0 | 1 | 0 | 1 | {Y[i, j], Y[i − 1, j], Y[i + 1, j]} |
| 0 | 1 | 1 | 0 | {Y[i, j], Y[i − 1, j], Y[i, j + 1]} |
| 0 | 1 | 1 | 1 | {Y[i, j], Y[i, j], Y[i − 1, j]} |
| 1 | 0 | 0 | 0 | {Y[i, j], Y[i, j], Y[i, j − 1], Y[i + 1, j], Y[i, j + 1]} |
| 1 | 0 | 0 | 1 | {Y[i, j], Y[i, j − 1], Y[i + 1, j]} |
| 1 | 0 | 1 | 0 | {Y[i, j], Y[i, j − 1], Y[i, j + 1]} |
| 1 | 0 | 1 | 1 | {Y[i, j], Y[i, j], Y[i, j − 1]} |
| 1 | 1 | 0 | 0 | {Y[i, j], Y[i + 1, j], Y[i, j + 1]} |
| 1 | 1 | 0 | 1 | {Y[i, j], Y[i, j], Y[i + 1, j]} |
| 1 | 1 | 1 | 0 | {Y[i, j], Y[i, j], Y[i, j + 1]} |
| 1 | 1 | 1 | 1 | {Y[i, j]} |

It should be noted on Table 1 that, if the number of edges surrounding the pixel P[i,j] is greater than 3, the proposed filtering pattern is inactive for the pixel P[i,j], which is kept unmodified. The proposed filtering pattern allows to eliminate any possible extreme value of the luminance component of a pixel belonging to the set S[i,j]. Besides, since there is no low-pass filtering in the described filtering pattern, no blurring effect is introduced into the picture.

It is to be noted on the described coding method that modifications or improvements may be proposed without departing from the scope of the invention. For instance, it is clear that this processing method can be implemented in several manners, such as by means of wired electronic circuits or, alternatively, by means of a set of instructions stored in a computer-readable medium, said instructions replacing at least part of said circuits and being executable under the control of a computer or a digital processor in order to carry out the same functions as fulfilled in said replaced circuits. The invention then also relates to a storage medium comprising a software module for storing a set of instructions executable under the control of a computer or a processor and provided for performing at least some of the steps of the processing method. The blocks in FIG. 1, FIG. 3 and FIG. 6, represent both a step of a method according to the invention and a processing circuit of a general filtering device for performing such a step.

It is to be noted in this text that the use of the verb "comprise" does not exclude the presence of other elements or steps than those listed in a claim.

What is claimed is:

1. A method of processing data which represents a sequence of pictures, previously encoded and decoded, the method comprising the steps of:
    examining pixels within a picture of said sequence to detect edge pixels and non-edge pixels;
    choosing from among the detected non-edge pixels a pixel to be filtered, wherein the chosen pixel is filtered if the number of edge pixels in pixel blocks containing, and adjacent to, the chosen pixel is not greater than a predetermined number and at least one block of pixels containing, and adjacent to, the chosen pixel contains at least a second predetermined number; and
    replacing the chosen pixel with a pixel that is selected from among said chosen pixel and at least one pixel of said pixels within a picture in immediate vertical, horizontal or diagonal adjacency with said chosen pixel.

2. A method of processing data as claimed in claim 1, wherein the selected pixel is the median pixel of a set having an odd number of members from among said detected non-edge pixels, at least one of said odd number of members being said chosen pixel, said odd number of members comprising said at least one pixel in immediate vertical, horizontal or diagonal adjacency.

3. A method of processing data as claimed in claim 1, wherein the method is applied to the luminance component of the pixels of said picture.

4. A method of processing data as claimed in claim 1, wherein a pixel is detected as an edge pixel if a magnitude representative of a gradient of the pixel is greater than a predetermined threshold.

5. A method of processing data as claimed in claim 4, wherein a pixel is detected as an edge pixel if the horizontal component of a gradient of said pixel is greater than the vertical component of said gradient and if the modulus of said gradient is greater than both the modulus of the gradient of the adjacent pixel on the left and the modulus of the gradient of the adjacent pixel on the right.

6. A method of processing data as claimed in claim 4, wherein a pixel is detected as an edge pixel if the vertical component of a gradient of said pixel is greater than the horizontal component of said gradient and if the modulus of said gradient is greater than both the modulus of the gradient of the adjacent lower pixel and the modulus of the gradient of the adjacent upper pixel.

7. A filtering device executing the steps of:
- examining pixels within a picture of said sequence to detect edge pixels and non-edge pixels;
- choosing from among the detected non-edge pixels a pixel to be filtered, wherein the chosen pixel is filtered if the number of edge pixels in pixel blocks containing, and adjacent to, the chosen pixel is not greater than a predetermined number and at least one block of pixels containing, and adjacent to, the chosen pixel contains at least a second predetermined number; and
- replacing the chosen pixel with a pixel that is selected from among said chosen pixel and at least one pixel of said pixels within a picture in immediate vertical, horizontal or diagonal adjacency with said chosen pixel.

8. A computer-readable storage medium storing a set of instructions executable under the control of a computer or a processor to perform the steps of:
- examining pixels within a picture of said sequence to detect edge pixels and non-edge pixels;
- choosing from among the detected non-edge pixels a pixel to be filtered, wherein the chosen pixel is filtered, if the number of edge pixels in pixel blocks containing, and adjacent to, the chosen pixel is not greater than a predetermined number and at least one block of pixels containing, and adjacent to, the chosen pixel contains at least a second predetermined number and
- replacing the chosen pixel with a pixel that is selected from among said chosen pixel and at least one pixel of said pixels within a picture in immediate vertical, horizontal or diagonal adjacency with said chosen pixel.

* * * * *